US012672037B2

(12) United States Patent
Khatibi et al.

(10) Patent No.: US 12,672,037 B2
(45) Date of Patent: Jun. 30, 2026

(54) MEASUREMENT ADJUSTMENT IN LOW MOBILITY

(71) Applicant: Nokia Technologies Oy, Espoo (FI)

(72) Inventors: Sina Khatibi, Munich (DE); Ingo Viering, Munich (DE); Irina-Mihaela Balan, Munich (DE); Umur Karabulut, Munich (DE); Kunjan Himanshubhai Shah, Ottobrunn (DE); Ahmad Awada, Munich (DE); Andreas Lobinger, Grafing (DE)

(73) Assignee: Nokia Technologies Oy, Espoo (FI)

( * ) Notice: Subject to any disclaimer, the term of this patent is extended or adjusted under 35 U.S.C. 154(b) by 386 days.

(21) Appl. No.: 18/272,401

(22) PCT Filed: Dec. 7, 2021

(86) PCT No.: PCT/EP2021/084552
§ 371 (c)(1),
(2) Date: Jul. 14, 2023

(87) PCT Pub. No.: WO2022/152468
PCT Pub. Date: Jul. 21, 2022

(65) Prior Publication Data
US 2024/0080727 A1     Mar. 7, 2024

(30) Foreign Application Priority Data
Jan. 15, 2021     (FI) ..................................... 20215051

(51) Int. Cl.
*H04L 12/26*     (2006.01)
*H04W 36/00*     (2009.01)
*H04W 36/08*     (2009.01)

(52) U.S. Cl.
CPC ... *H04W 36/0085* (2018.08); *H04W 36/0058* (2018.08); *H04W 36/085* (2023.05)

(58) Field of Classification Search
CPC ......... H04W 36/0085; H04W 36/0058; H04W 36/085; H04W 24/02; H04L 47/10;
(Continued)

(56) References Cited

U.S. PATENT DOCUMENTS 7,408,900 B2 *   8/2008   Hunkeler ............ H04W 36/302
                                                  370/332
9,668,189 B2 *   5/2017   Wang ............ H04W 36/008375
(Continued)

FOREIGN PATENT DOCUMENTS

EP              3751900 A1    12/2020

OTHER PUBLICATIONS

Nokia et al., "Consideration on the CU-DU impacts of the per-beam mobility setting change," 3GPP TSG-RAN WG3 Meeting #113-e, R3-213388, Aug. 16-27, 2021.
(Continued)

*Primary Examiner* — Phuongchau Ba Nguyen
(74) *Attorney, Agent, or Firm* — Robert P. Michal, Esq.; Rimon PC

(57) ABSTRACT

There is provided an apparatus, a method and a computer program product. In accordance with an embodiment the method includes measuring signals of one or more beams of a cell of a wireless communication network for handover; obtaining information of an identity of the one or more beams from the measured signals; storing the measurement results and the identity of the one or more beams; and sending the measurement results and the identity of the one or more beams to the wireless communication network when at least one predetermined condition is fulfilled.

16 Claims, 9 Drawing Sheets

(58) Field of Classification Search
CPC . H04L 43/50; H04L 12/2697; H04L 43/0852; H04L 43/00
See application file for complete search history.

(56) References Cited

U.S. PATENT DOCUMENTS

| | | | |
|---|---|---|---|
| 11,864,038 B2 * | 1/2024 | Ingale | H04L 5/0092 |
| 2007/0213055 A1 * | 9/2007 | Sundberg | H04W 36/0085 |
| | | | 455/436 |
| 2017/0215117 A1 * | 7/2017 | Kwon | H04B 7/0617 |
| 2018/0049078 A1 | 2/2018 | Yang et al. | |
| 2020/0084089 A1 * | 3/2020 | Da Silva | H04L 1/0026 |
| 2020/0154326 A1 | 5/2020 | Deenoo et al. | |
| 2022/0078099 A1 * | 3/2022 | Zhohov | H04W 24/02 |
| 2022/0295358 A1 * | 9/2022 | Liu | H04W 24/02 |

OTHER PUBLICATIONS

Nokia et al., "[SON, TP to BL CR to TS 38.473] Further discussion on the CU-DU impacts of the per-beam mobility setting change," 3GPP TSG-RAN WG3 Meeting #114-e, R3-214812, Nov. 1-11, 2021.

* cited by examiner

MEASUREMENT ADJUSTMENT IN LOW MOBILITY

CROSS REFERENCE TO RELATED APPLICATION

This patent application is a U.S. National Stage application of International Patent Application Number PCT/EP2021/084552 filed Dec. 7, 2021, which is hereby incorporated by reference in its entirety, and claims priority to FI 20215051 filed Jan. 15, 2021.

TECHNICAL FIELD

The present invention relates to a method and apparatus for measurement adjustment in low mobility of a user equipment.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. In 5G systems a base station may have a MIMO (Multiple In Multiple Out) antenna array comprising dozens of individual antenna elements. Signals to and from those antenna elements can be controlled e.g. by signal-processing algorithms so that a good transmission route may be utilized through air to each user equipment. Then the base stations can send individual data packets in many different directions (with different beams). Beamforming allows many users and antennas on such MIMO array to exchange much more information at once, For millimeter waves used in 5G networks, beamforming is primarily used to address a different set of problems: cellular signals are easily blocked by objects and tend to weaken over long distances, wherein beamforming may help by focusing a signal in a concentrated beam that points only in the direction of a user equipment rather than broadcasting in many directions at once. This approach may increase the probability that the signals arrive intact and may also reduce interference for everyone else.

A so-called Mobility Robustness Optimization (MRO) issue is a method to optimize mobility parameters to minimize mobility related failures and unnecessary handovers. A common approach in MRO algorithms is optimizing a Cell Individual Offset (CIO) and Time-to-Trigger (TTT), i.e., the key parameters in controlling the handover procedure initiation. The network can control the handover procedure between any cell pair in the network by defining different CIO and TTT values. Different CIO and TTT configuration may be needed for mobile terminals with different speed of movement. The faster the terminals move, the sooner the handover procedure should be started when the terminal is approaching an edge of a cell. This goal may be achieved by either increasing the CIO, i.e. the offset between the measured signal power of serving cell and the target cell, or decreasing the TTT, i.e. the interval, during which the trigger requirement is fulfilled or both. In contrast, in the cell boundaries dominated by relatively slowly moving terminals, the handover procedures are started relatively later by choosing lower values for the CIO and/or higher for the TTT.

SUMMARY

Some embodiments of the disclosure provide a method and apparatus for mobility robustness optimization (MRO) issue in cellular mobile communications.

Some embodiments are implemented in the context of the 5G communication systems and relate to the mobility robustness optimization issue in cellular mobile communications. Some aspects of the disclosure are summarized below:

The mobile terminal uses CIO and TTT based on the serving beam.

The mobile terminal logs the serving beam(s) and connection duration to the beam(s) in addition to related information (optional) for an interval $\Delta t$ (set by network), such that it is available in case of a handover or loosing connectivity (RLF, Beam Failure (BF), or BFR).

An alternative can be to log only the last N-serving beams.

Beam CIO/TTT update UE behavior (network configured):

The mobile terminal postpones updating the CIO/TTT when moving to new beam while entering condition applies (i.e. TTT timer is running) and carry on with handover if TTT timer expires.

The mobile terminal updates the CIO/TTT when the leaving condition applies immediately to the new beam setting.

The mobile terminal updates the CIO/TTT immediately after beam switch if a forced_update for the beam pair is set (regardless of the TTT timer and entering condition).

The mobile terminal sends the logged information during $\Delta t$ (serving beam and related information) to the target cell in case of successful handover as part of the Successful handover report.

The mobile terminal sends the logged information during $\Delta t$ (serving beam and related information) to the target in case of RLF in RLF reports.

The target cell shares this information with the source cell over Xn interface or to a trace collection entity.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided a mobile terminal comprising:

means for measuring signals of one or more beams of a cell of a wireless communication network for handover;

means for obtaining information of an identity of the one or more beams from the measured signals;

means for storing the measurement results and the identity of the one or more beams;

means for determining whether to update one or more parameters related to the handover; and means for sending the measurement results and the identity of the one or more beams to the wireless communication network when at least one predetermined condition is fulfilled.

According to a second aspect there is provided a method comprising:

measuring signals of one or more beams of a cell of a wireless communication network for handover;

obtaining information of an identity of the one or more beams from the measured signals;

storing the measurement results and the identity of the one or more beams;

determining whether to update one or more parameters related to the handover; and sending the measurement results and the identity of the one or more beams to the wireless communication network when at least one predetermined condition is fulfilled.

According to a third aspect there is provided an apparatus comprising at least one processor; and at least one memory including computer program code the at least one memory and the computer program code configured to, with the at least one processor, cause the apparatus to perform at least the following:

measure signals of one or more beams of a cell of a wireless communication network for handover;

obtain information of an identity of the one or more beams from the measured signals;

store the measurement results and the identity of the one or more beams;

determine whether to update one or more parameters related to the handover; and send the measurement results and the identity of the one or more beams to the wireless communication network when at least one predetermined condition is fulfilled.

According to a fourth aspect there is provided an apparatus comprising:

a first circuitry configured to measure signals of one or more beams of a cell of a wireless communication network for handover;

a second circuitry configured to obtain information of an identity of the one or more beams from the measured signals;

a third circuitry configured to store the measurement results and the identity of the one or more beams;

a fourth circuitry configured to determine whether to update one or more parameters related to the handover; and a fifth circuitry configured to send the measurement results and the identity of the one or more beams to the wireless communication network when at least one predetermined condition is fulfilled.

According to a fifth aspect there is provided a base station of a wireless communication network comprising:

means for receiving from a mobile terminal information of measurement results and identity of one or more beams of a cell of the wireless communication network;

means for obtaining a value of at least one parameter for handover on the basis of the received measurement results;

means for using the obtained value to update a stored value of the at least one parameter; and means for sending the updated value to another base station of the wireless communication network.

According to a sixth aspect there is provided a computer program comprising computer readable program code which, when executed by at least one processor; cause the apparatus to perform at least the following:

receiving from a mobile terminal information of measurement results and identity of one or more beams of a cell of the wireless communication network;

obtaining a value of at least one parameter for handover on the basis of the received measurement results;

using the obtained value to update a stored value of the at least one parameter; and sending the updated value to another base station of the wireless communication network.

According to a seventh aspect there is provided an apparatus comprising at least one processor; and at least one memory including computer program code the at least one memory and the computer program code configured to, with the at least one processor, cause the apparatus to perform at least the following:

receive from a mobile terminal information of measurement results and identity of one or more beams of a cell of the wireless communication network;

obtain a value of at least one parameter for handover on the basis of the received measurement results;

use the obtained value to update a stored value of the at least one parameter; and send the updated value to another base station of the wireless communication network.

According to an eighth aspect there is provided an apparatus comprising:

a first circuitry configured to receive from a mobile terminal information of measurement results and identity of one or more beams of a cell of the wireless communication network;

a second circuitry configured to obtain a value of at least one parameter for handover on the basis of the received measurement results;

a third circuitry configured to use the obtained value to update a stored value of the at least one parameter; and a fourth circuitry configured to send the updated value to another base station of the wireless communication network.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
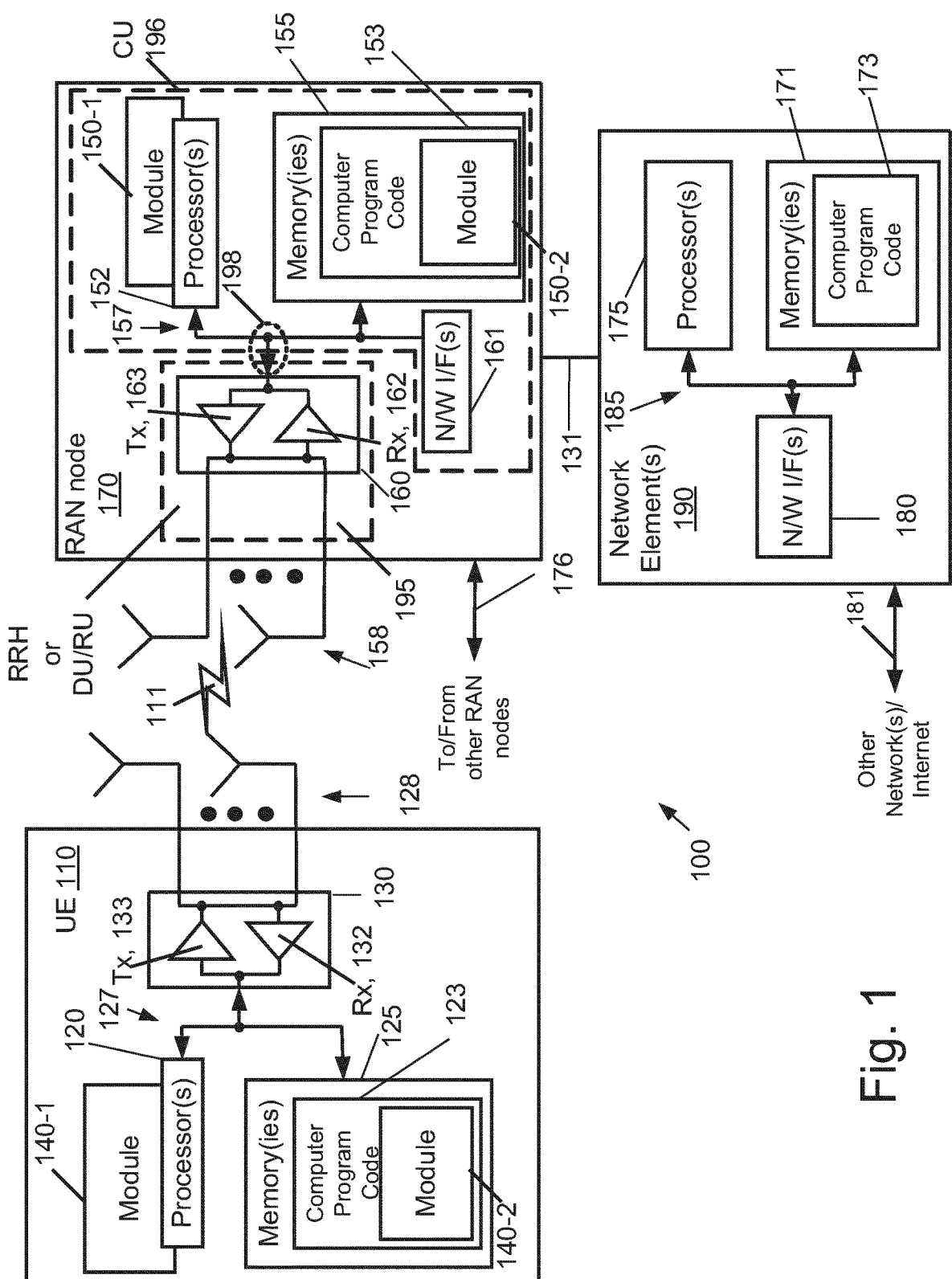
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/VV I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element (s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

Figures 2A, 2B:
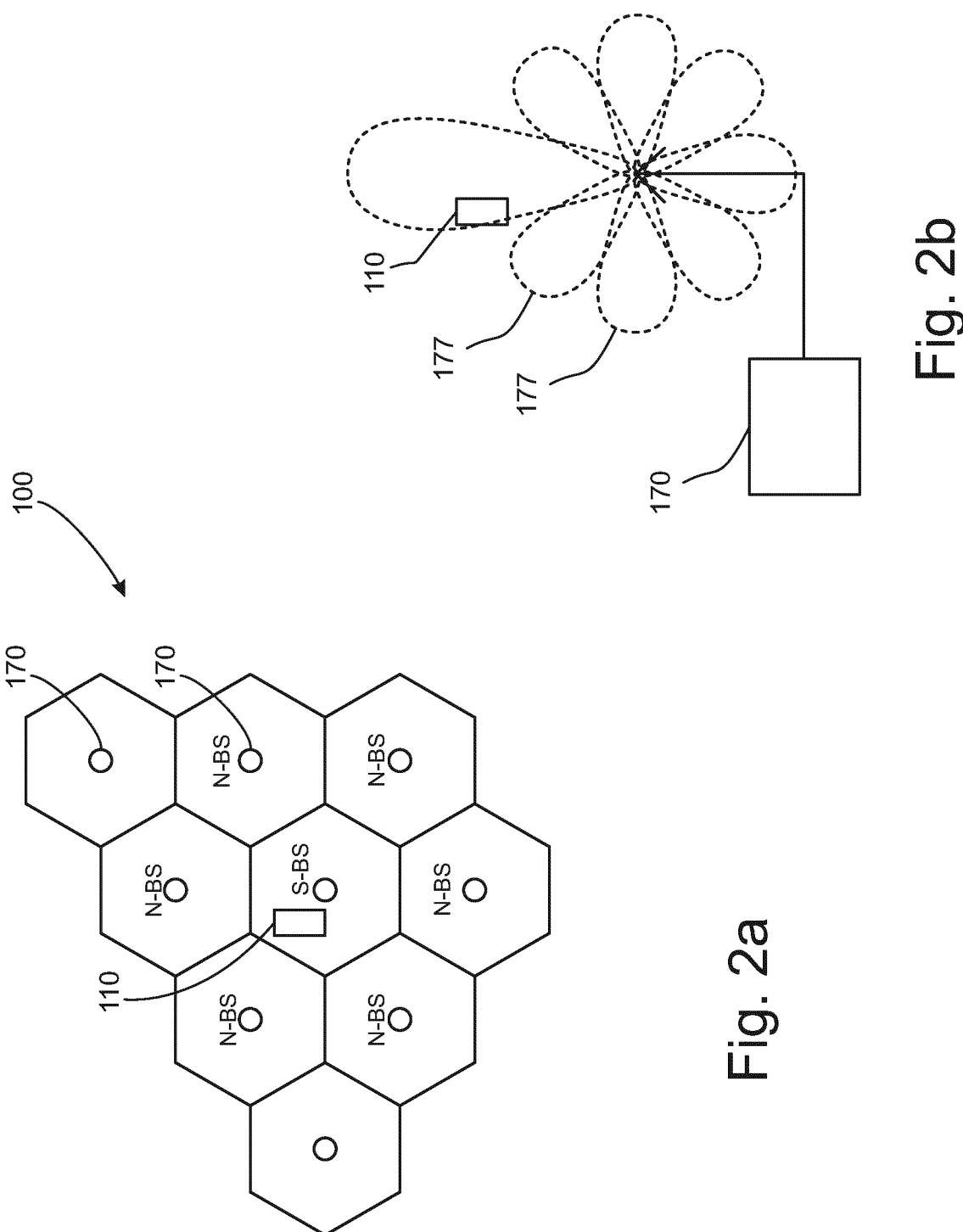
FIG. 2a illustrates a part of a wireless network having several base stations and an exemplary user equipment.
FIG. 2b illustrates in a simplified manner beams of a base station serving an exemplary user equipment.

FIG. 2a illustrates a part of a wireless network 100 having several base stations 170 and an exemplary user equipment 110. In FIG. 2a it is assumed that the base station marked as S-BS is the serving base station, when the user equipment is in connected mode, and the base station where the user equipment is camped on when not in connected mode. Some of the neighbouring base stations are labelled as N-BS in FIG. 2a. In practical situations the serving base station and the camped on base station may change e.g. when the user equipment is moving, or if the signal strength from different base stations changes (e.g. signals from a neighbouring base station N-BS becomes stronger than signals from the currently serving base station.

The serving base station may have assigned one or more beams 177 (FIG. 2b) for the user equipment on the basis of some criteria. For example, that beam which is directed towards the location of the user equipment may be selected for the user equipment and if the user equipment moves to another location, another beam directed towards that new location may be selected instead. In FIG. 2*b* most of the beams are illustrated being similar to each other and one beam is illustrated to have stronger signal than the others but in practical implementations different beams may have different parameters such as signal strength, width, length etc. It should also be noted that the beams depicted in FIG. 2*b* are only illustrative but in reality the beams may have different forms and sizes.

In accordance with an example, the base station (a.k.a. an access point), may have one or more transmission-reception points (TRP) which transmit transmission beams to be received by user equipment(s).

A base station may have a spatial beam codebook which includes information of beams available by a base station.

A spatial beam codebook may be defined as follows, for example.

A spatial beam codebook of size $N_B$ and whose elements are indexed by b is defined, wherein b=1, 2, . . . , $N_B$. Each spatial beam (worded as beam henceforth) corresponds to a radiation pattern whose main lobe is uniquely directed to an angular direction with respect to the antenna array broadside in both the azimuth (i.e. horizontal) and zenith (i.e. vertical) planes. The angular direction for the bth beam may be denoted as $(h_b, v_b)$ where $h_b$ and $v_b$ are horizontal angles and vertical angles of the bth beam, respectively.

A beam-frequency resource pool (also worded as resource pool henceforth) may be defined as follows, in accordance with an embodiment.

A beam-frequency resource is a resource for data transmission consisting of a set of subcarriers (i.e. a resource block) that are sent over multiple antennas and whose per-antenna weight is determined by the beam index. Each beam-frequency resource is addressed either by the pair (b, f) or the triplet $(h_b, v_b, f)$ where $$f = 1, 2, \ldots , N_F^{Global}$$

where $$N_F^{Global}$$

is the global total number of frequency resources. The global resource pool can be denoted as $A^{Global}=\{(b, f)|\forall b, \forall f\}$.

The beam-frequency resource pool is the set of paired resources for use by a RAT. In general, the resource pools are non-orthogonal (i.e. may be interfering) to each other.

A serving beam ID corresponds to the index of the Synchronization Signal Block (SSB) or Channel State Information Reference Signal (CSI-RS) that is quasi co-located with a De-Modulation Reference Signal (DMRS) of a Physical Downlink Control Channel (PDCCH) and/or a Physical Downlink Shared Channel (PDSCH) used for communication with the mobile terminal.

Whereas the speed of the mobile terminals may play an obvious role, it is not the only criteria. Slowly moving mobile terminals may also be under risk of losing communication connection when moving through areas with significant propagation changes, wherein an earlier handover should be performed. Some examples where significant propagation changes may occur are areas having very steep shadowing slopes. On the other hand, relatively fast moving mobile terminals may not be under risk when moving through areas with little propagation changes (e.g. flat shadowing slopes). Hence, even if the velocity of the mobile terminal could be instantaneously estimated with enough accuracy, which may be extremely challenging or even impossible, velocity-based methods might not always react correctly.

In the following illustration, the terms "slow" or "slowly moving" refers to mobile terminals which are not under communication failure (e.g. Radio Link Failure, RLF) risk but may still suffer a so-called ping-pong effect i.e. repeatedly changing the serving cell back and forth two cells. The term "fast" refers such mobile terminals which are under risk of communication failure.

The MRO for the cell-pair boundaries with a combination of slow and fast mobile terminals is challenging since choosing the correct handover parameters (CIO or TTT) based on any of those groups speed may lead to mobility failures (e.g., too late, too early, or ping-pong handover) of the other group. Hence, it is desired to apply a technique to group the users and choose the mobility parameters for each group independently.

In a beam-specific MRO approach the network creates beam specific key performance indicators (KPIs) and derives beam specific CIOs (bCIOs). The UE is not involved in this approach. This implies that the network must reconfigure the UE with a new CIO whenever the UE is switched to a new beam. Furthermore, the network must make its evaluation with existing information.

The available information after mobility failures for beam-based MRO to optimize the bCIOs is limited or missing.

In accordance with an approach of this disclosure, UEs log serving beam information for a given interval and report it back to network upon radio failure. The interval may be determined and given to the UE e.g. by the network.

Logging the serving beam information may comprise repeatedly measuring signal properties and calculating a combination of the measurement results, such as an average, a maximum value, a minimum value and/or some other calculation.

Figures 3A, 3B, 3C:
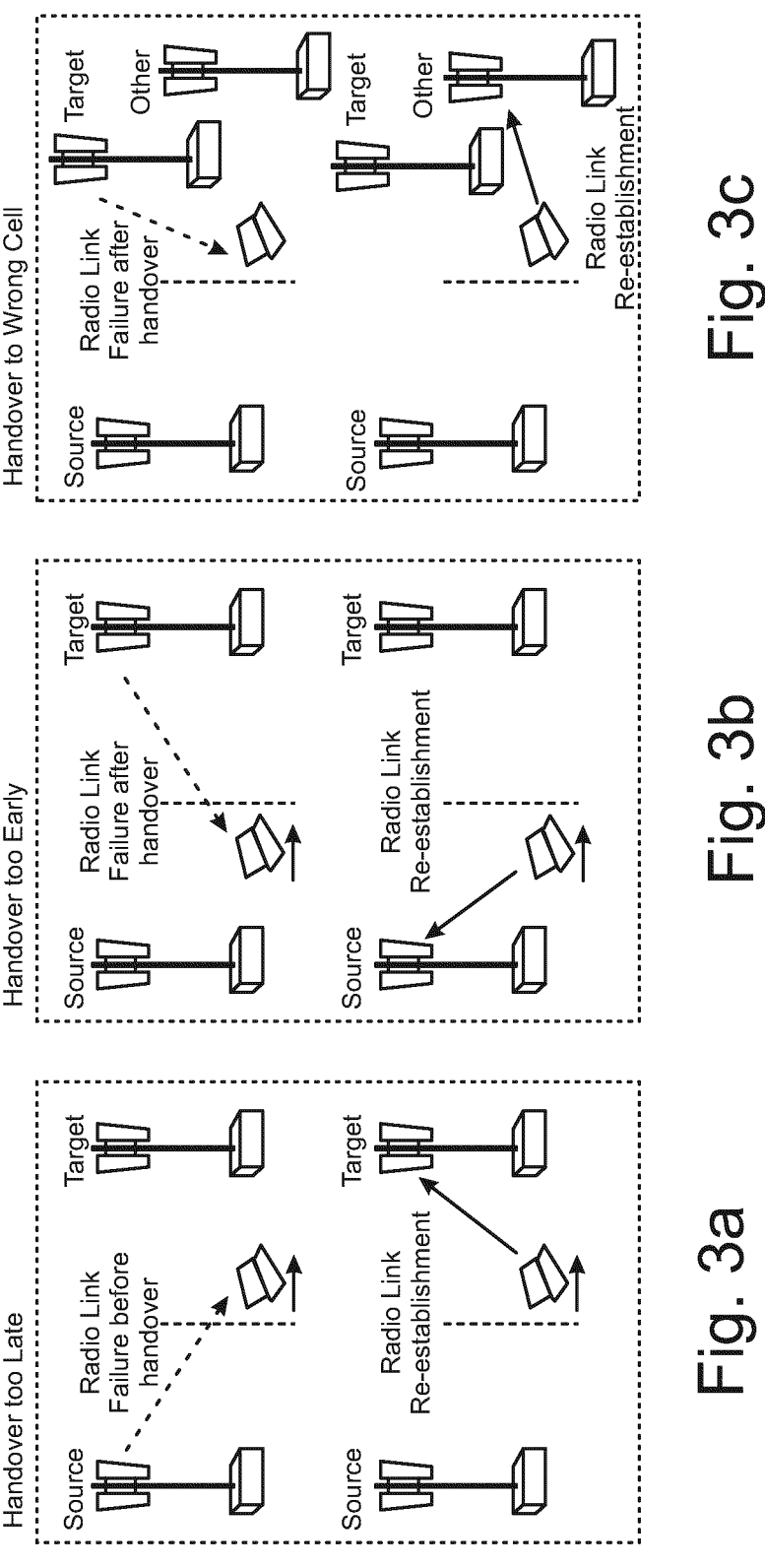
FIG. 3a shows an example of a too late handover.
FIG. 3b shows examples of a too early handover.
FIG. 3c shows an example of a handover to a wrong cell.

The beam-based MRO may be challenging when the terminals move among multiple beams before moving to another cell. In these cases, finding the responsible beam (i.e. the parameters of which have caused the failure and hence should be modified) is a non-trivial task and it usually contains uncertainty. The mobility related failures can be classified into four categories, as follows, which are also illustrated in FIGS. 3*a*-3*c*:

Too Late (TL) handover failures: in this type of failures, either UE did not even send out a measurement report (e.g., since the TTT timer did not expire before the RLF), or the measurement report or the handover command got lost due to degrading channel conditions, and thus the UE has not started the handover procedure although it is near a cell edge or even in the area of a neighbour cell, as is illustrated in FIG. 3*a*. The solution for eliminating these failures is to start the handover relatively sooner, hence, the MRO increases the related CIO.

Too Early (TE) handover failures: This type of failures happen when an A3 entry condition has been met (the signal of a neighbour cell plus a hysteresis margin becomes better than the signal of the serving cell, e.g. as defied in ETSI TS 138 331 v. 16.1.0,), the TTT timer expires, and the UE performs the handover procedure. However, shortly after the handover, the UE experiences Radio Link Failure (RLF) e.g. because the terminal is still within the source cell and too far away from the target cell, as is illustrated in FIG. 3b. In these cases, it is apparent that the handover procedure should have started relatively later. Hence, the MRO reduces the related CIO value.

Another example for a too early initiated handover is the expiry of a timer T304, also called "Handover Failure". This happens, when the target cell is not good enough, such that even the Random Access (RACH) is not successful.

Wrong Cell (WC) Handover failures: radio link failure occurs in the target cell shortly after a handover has been completed, and the UE attempts to re-establish its radio link in a cell which is neither the source cell nor the target cell. Alternatively, the timer T304 expires during the handover procedure (i.e., "Handover failure"), and the UE attempts to re-establish its radio link in a cell which is neither the source cell nor the target cell. This is illustrated in FIG. 3c.

Ping-pong (PP) handover failures refer to cases that the UE hands over to the target cell but shortly after that the UE has to handover back the source cell. This case is usually considered as another form of TE handover.

MRO procedures can identify a bad handover decision and enable the related cell to correct them. In a cell-pair based MRO, finding the root causes for the failure and the guilty cell (i.e., the cell responsible for setting the correct value of CIO) comparing to the beam-based MRO is easier than in a beam-based MRO.

Figures 4A, 4B:
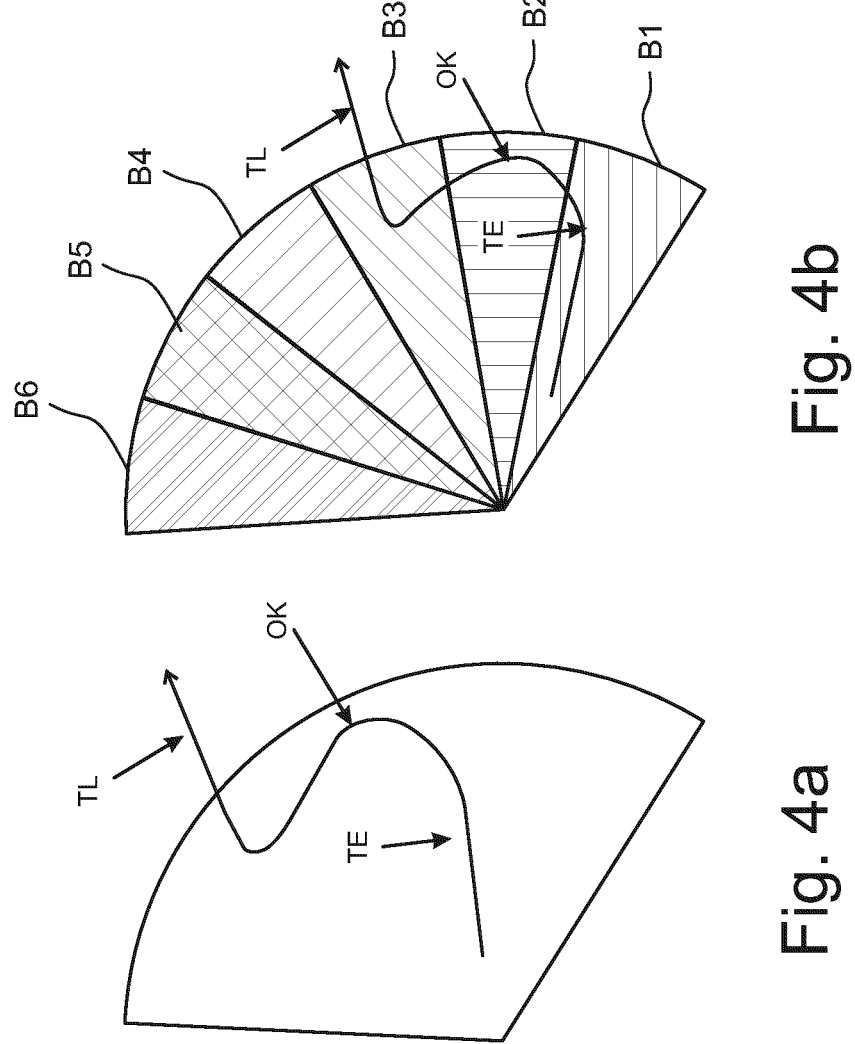
FIG. 4a illustrates an example of a cell-based MRO.
FIG. 4b illustrates an example of a beam-based MRO.

FIG. 4a illustrates an example of a cell-based MRO so that a mobile terminal is moving within the serving cell and moves towards a neighbouring cell. The continuous line presents an example of a path of the mobile terminal. There are also depicted some examples of locations in which a too-early handover (TE), a too-late handover (TL) and a properly timed handover (OK) might happen. As it is apparent from FIG. 4a, the source cell is responsible for all the failures and the CIO can be optimized.

FIG. 4b illustrates an example of a beam-based MRO so that a mobile terminal is moving within the serving cell but along different beams while moving towards a neighbouring cell. The continuous line presents an example of a path of the mobile terminal. Different beams are illustrated with different kinds of hatched sectors. As was the case above with the example of the cell-based MRO, FIG. 4b depicts examples of locations in which a too-early handover (TE), a too-late handover (TL) and a properly timed handover (OK) might happen.

However, in the beam-based MRO, the beam causing the failure is not always the last serving beam for the mobile terminal or the beam in which the enter condition for initiating the handover procedure (e.g. by starting the TTT timer) applied. For instance, in the example of FIG. 4b, too-late handover would happen when the entering condition for handover initiation applied in the third beam B3. On the other hand, if the TTT timer were started when the mobile terminal is within the area of the first beam B1 of FIG. 4b, a too-early handover failure might occur. On the ground of these observations, the proper time to the enter condition is when the mobile terminal is somewhere between the second beam B2 and the third beam B3 of the example of FIG. 4b. Given the unpredictable nature of the channel, some level of uncertainty may always remain to find the responsible beam.

When a mobile terminal faces a radio link failure, it may prepare a message such as a RLF report. In this report the following information may be included:

Information related to Radio Link Monitoring (RLM), Beam Failure Detection (BFD) and Beam Failure Recovery (BFR) on the serving cell, i.e. the cell where the radio link failure was detected, and on the target cell, in case of handover failure, beam measurements (RSRP/Q, SINR, Qout/Qin) on SSB/CSI-RS Information on RRM measurements per beam on the serving cell, where the RLF was detected, and on the target cell, in case of handover failure, beam level measurements and RACH related information The RLF report may also include one or more of the following: an identifier of the one or more directional beams associated with the RLF event, beam reference signal received power of the one or more directional beams associated with the RLF event, a beam measurement of the one or more directional beams associated with the RLF event. Additionally or instead of the above, the RLF report may include a list of beams allocated by the target gNB and/or information on a beam among the list of beams used by the UE until the RLF happens.

The utilization of beamforming in the 5G NR makes it is possible to increase spatial granularity of the boundaries from cell-pair to beam-cell pair. Hence, in accordance with an approach of the disclosure, mobile terminals can be divided into smaller groups based on their serving beam. Therefore, different handover parameters (i.e., CIO and TTT) can be set for different groups. In other words, in the beam-based MRO the network may set up beam-specific handover statistics, optimize different CIO/TTT for different beam-cell pairs, and configure different CIO/TTTs depending on the beams, in the area of which the mobile terminal is moving.

This approach may make it possible to determine the correct beam or beams that needs to update its/their CIO/TTT values and for more control over the handover procedure in a beamformed environment.

In the following, an example embodiment of the disclosure will be described in more detail. It should be noted that although the following disclosure describes some elements which perform certain tasks (e.g. a radio access network (RAN) node 170, one or more processors 120 of a mobile terminal, etc., it may be possible that in some implementations these tasks are performed by some other entities.

The network can send by e.g. a communication circuitry of the radio access network (RAN) node 170 a configuration message to the mobile terminal. When the mobile terminal has received the configuration message e.g. by the transceiver 130 and the processor 120 has interpreted the contents, the mobile terminal configures that the behaviour of the mobile terminal in terms of which CIO/TTT to use upon changing the serving beam is as follows.

If the entering condition is not applied i.e., the TTT timer is not running, the mobile terminal is configured to update the CIO/TTT based on the configuration of the new serving beam.

If the entering condition is applied i.e., TTT timer is running and the forced_update flag is set, the mobile terminal is configured to update the CIO/TTT based on the configuration of the new serving beam.

If the entering condition is applied and the forced_update flag is not set, the mobile terminal is configured to postpone the update of CIO/TTT when entering condition is met, i.e. the TTT timer of a measurement event has been started, to perform the update of CIO/TTT when the leaving condition is met i.e. TTT timer is stopped, and to execute the handover when the TTT timer expires.

In accordance with an embodiment of the disclosure, the forced_update flag is configured per serving beam X or group of beams. It means that the mobile terminal may force the update of the CIO/TTT when it is served by beam X and stall it when served by other beams.

In accordance with another embodiment of the disclosure, the forced_update flag is configured per neighbouring cell X. That is, the mobile terminal may force the update of the CIO/TTT when the entering condition is fulfilled for neighbouring cell X and stall it when fulfilled for other neighbouring cells.

In accordance with yet another embodiment of the disclosure, the mobile terminal may report as part of the successful handover or the RLF report whether the forced_update flag was enabled by the network or not.

The update of CIO/TTT applies for both triggering the handover, e.g., A3 event, in legacy handover and triggering the handover preparation and/or execution for conditional handover.

In the following a method according to an embodiment of the disclosure is described in more detail with reference to FIG. 5 and the flow diagram of FIG. 6 in a situation in which a mobile terminal UE experiences a failure in the communication connection, for example when moving within a serving cell 505 and approaching to a neighbouring cell 506.

Figure 5:
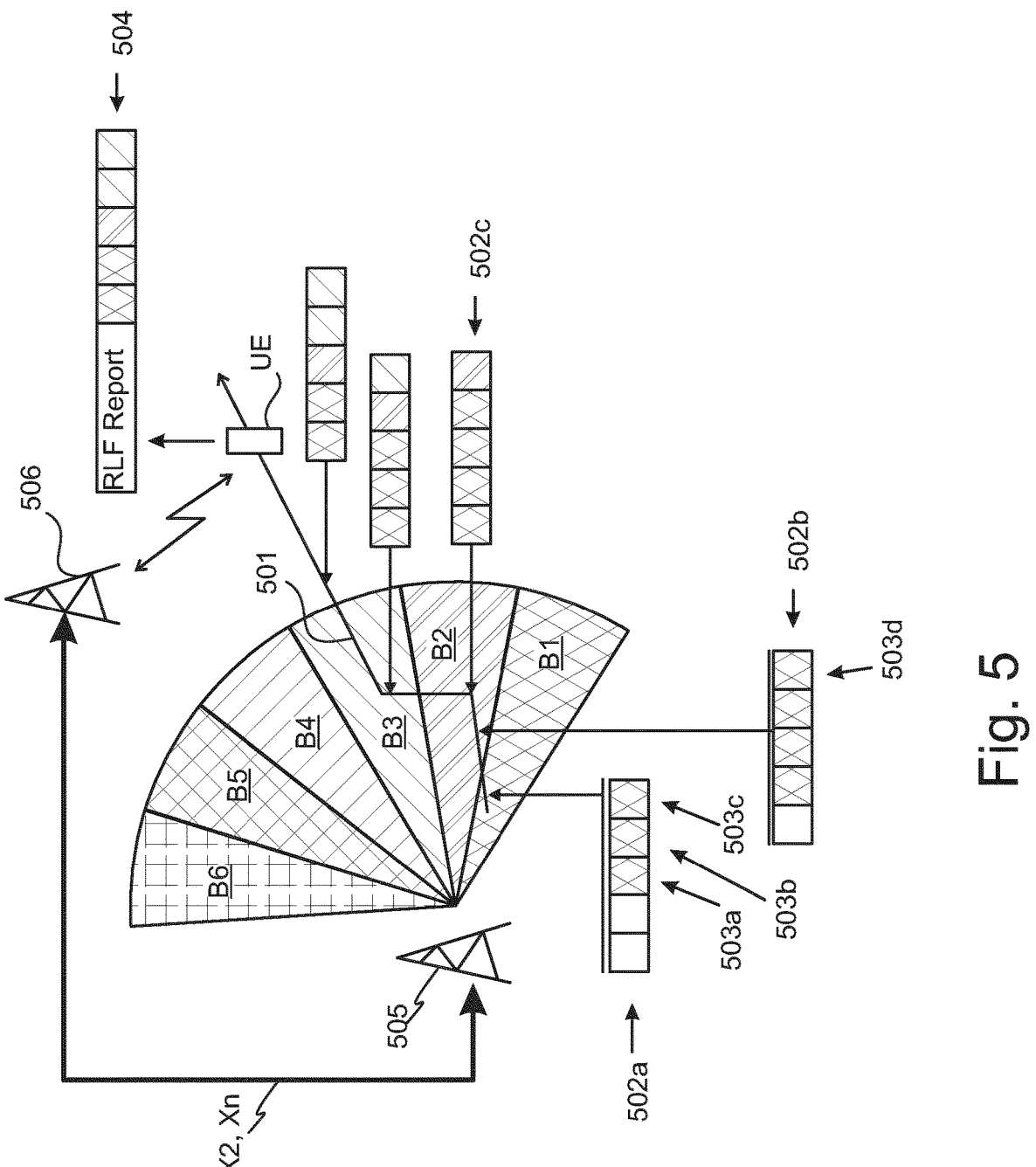
FIG. 5 shows an example of a movement of a mobile terminal along service areas of different beams in a communication network.

An example of the route of the mobile terminal is depicted with the continuous line 501 in FIG. 5 and beams of the currently serving cell are illustrated with hashed sectors B1 to B6. It should be noted that in practise the radiation patterns of the beams of a cell are not exactly covering the geographic area so that neighbouring beams are not overlapping. Also, the coverage area of different beams are not usually the same with different beams.

Figure 6:
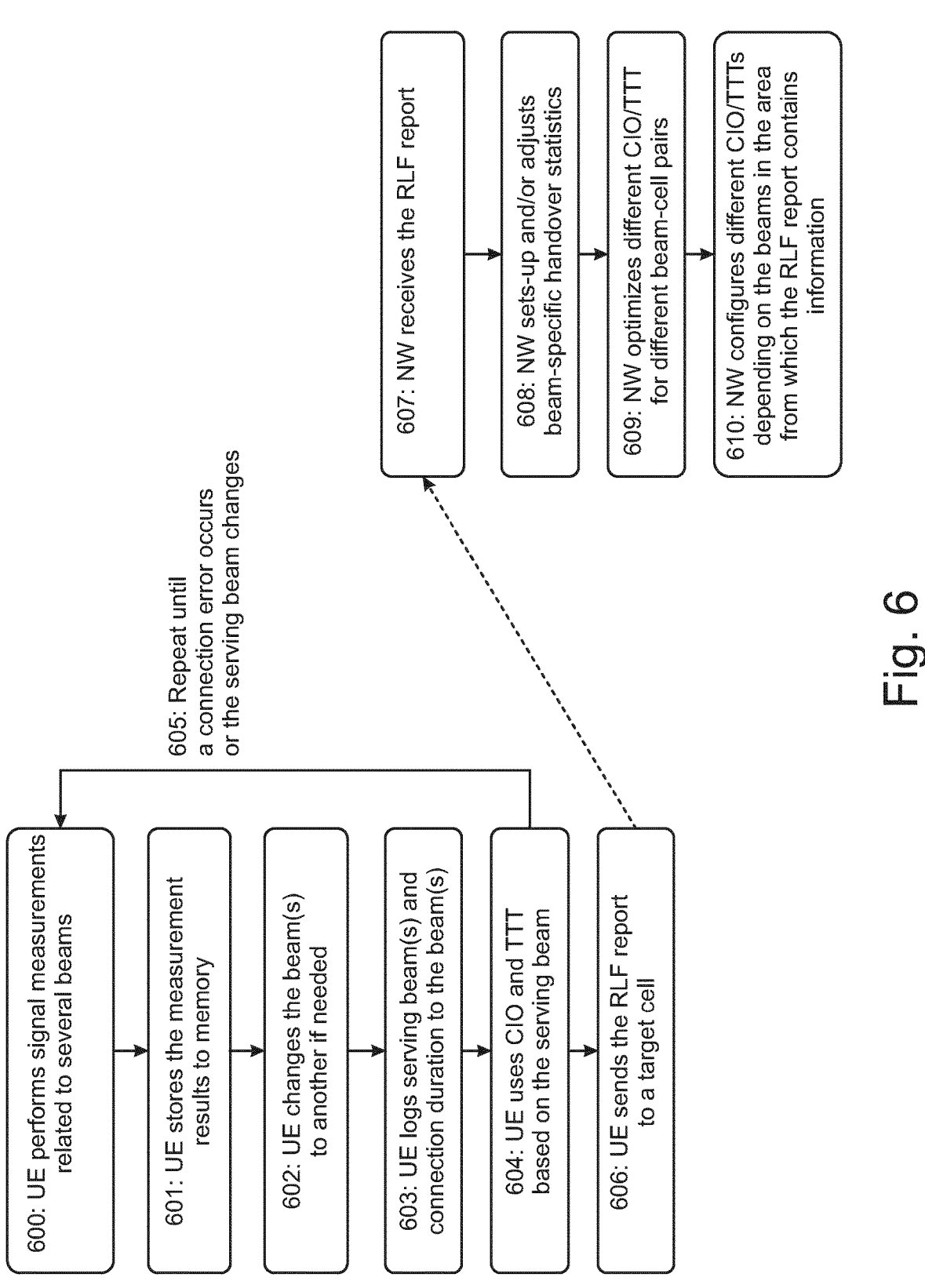
FIG. 6 is a flow diagram of a method, in accordance with an embodiment.

The mobile terminal UE is moving along the path 501 and performs signal measurements regularly (block 600 in FIG. 6). In the example of FIG. 5, several measurements are performed when the mobile terminal UE is served by the first beam B1. The measurement results are stored 601 into a memory e.g. as data fields 503 in a measurement frame 502. The hashed squares of the measurement frames 502 illustrate the beams from which the measurement results have been obtained. For example, in the first measurement frame 502a in FIG. 5 there are three data fields 503a-503c comprising inter alia the measurement results and beam identity. After a subsequent measurement has been performed, one data field 503d is added to the measurement frame, illustrated with 502b in FIG. 5. The mobile terminal UE may change 602 the currently used beam to another beam if, for example the measurement results indicate that another beam should be used. The mobile terminal UE logs 603 the serving beam(s) and connection duration to the beam(s) in addition to related information (optional) for an interval Δt (set by the network), such that it is available in case of a handover or loosing connectivity (RLF, Beam Failure (BF), or BFR). The mobile terminal UE is configured 604 to use CIO and TTT based on the serving beam, which in the example of FIG. 5 is initially the first beam B1. When the mobile terminal UE has moved to the area in which the second beam B2 is the serving beam further measurements are performed and the measurement results as well as the beam identity are added to the measurement frame (illustrated with 502c). The measurements and storage (data logging) operations and possibly the change of the serving beam may be repeated 605 during the travelling of the mobile terminal UE.

FIG. 5 also illustrates a situation in which the mobile terminal approaches to an edge of the currently serving cell 505 (a source cell) and enters to an area of beams of a neighbouring cell 506 (a target cell). It is assumed here that the mobile terminal experiences a failure when trying to handover to the neighbouring (target) cell 506. Hence, the mobile terminal may perform the following operations.

The mobile terminal UE sends 606 to the target cell 506, for example after a successful reconnect operation, e.g. as a part of RLF report the serving beams, serving duration, and all related information which have been obtained during the movement of the mobile terminal. An example of the RLF report is illustrated with the rectangle 504 in FIG. 5 in which the hashes squares illustrate the measured, beam related information. In accordance with an embodiment of the disclosure, the target cell 506 shares this information with the source cell 505 via an Xn interface. The target cell 506 may share this information with any other network management entity including but not limiting to Near Real-Time RAN Intelligence Controller (NRT RIC) in Open-RAN (O-RAN) architecture or a network entity hosting MRO algorithm or a trace collection entity.

When the network, e.g. the target cell 506 and/or the source cell 505, have received 607 the RLF report, the network set up and/or adjust 608 beam-specific handover statistics, optimize 609 different CIO/TTT for different beam-cell pairs, and configure 610 different CIO/TTTs depending on the beams, in the area of which the mobile terminal is moving. For example, if the mobile terminal has amended the value of the CIO the network may use this adjusted value and the beam ID to amend a corresponding CIO value in the network to be utilized with succeeding handovers of the same or another mobile terminal served by that beam.

It may also happen that the mobile terminal UE is not reconnecting to neither the serving (source) cell nor the target cell but attempts to re-establish its radio link in a cell which is neither the source cell nor the target cell. If the re-establishment is successful, the mobile terminal UE sends the RLF report to the cell where the mobile terminal UE managed to re-establish its radio link. On the other hand, if the re-establishment is unsuccessful, the mobile terminal UE may go to an idle state and try to reconnect, either immediately, or later, e.g. up to 48 hours later.

It should be noted that the re-connection and re-establishment may happen to a previously serving cell, or to another cell (maybe the target cell of a previous handover attempt, or any other cell). The another cell may be, for instance, the cell having the strongest signal received by the mobile terminal UE at the moment when the re-establishment or the re-connection is performed.

Figure 7:
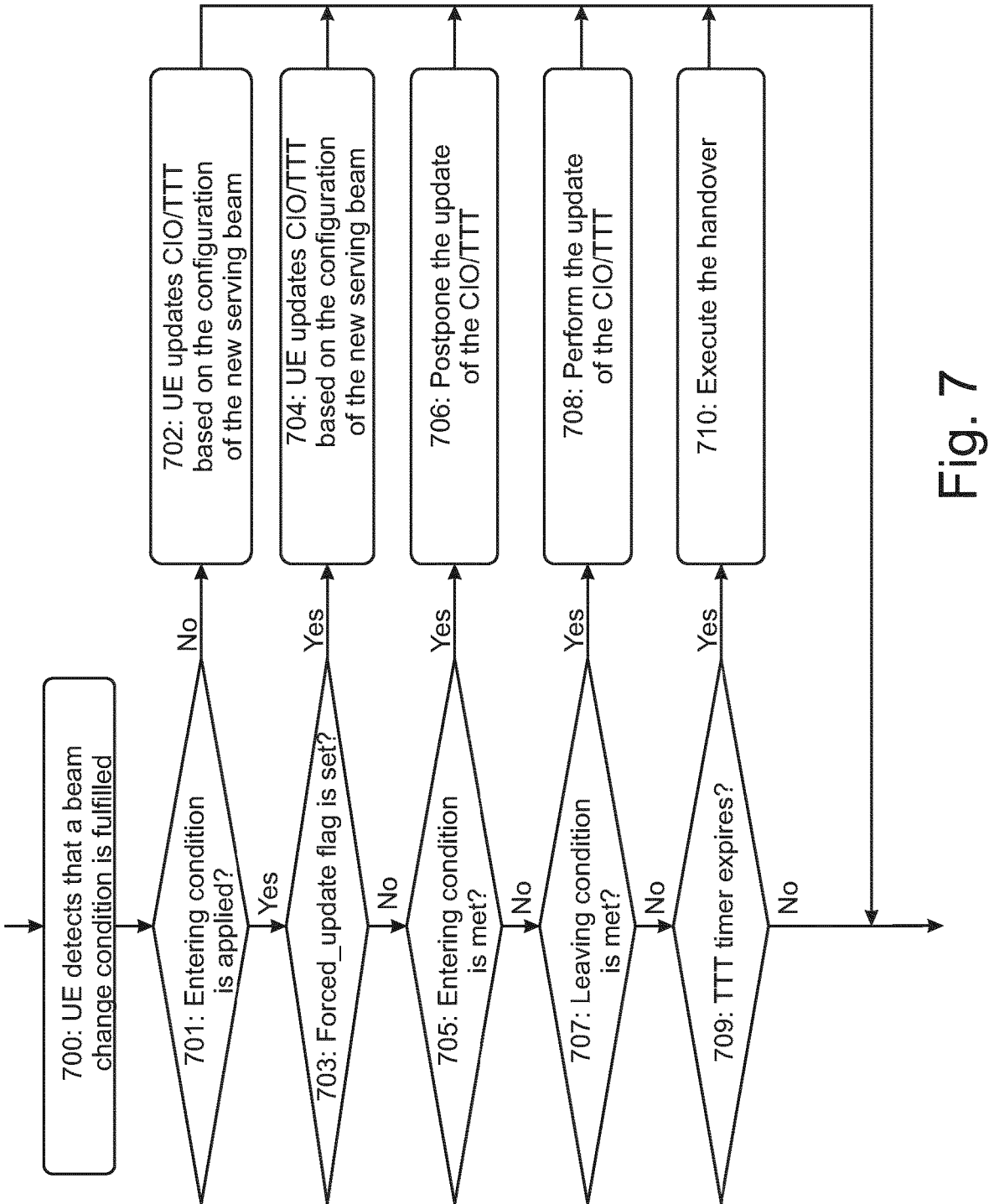
FIG. 7 is a flow diagram of a method, in accordance with an embodiment.

In the following a method in the mobile terminal according to an embodiment of the disclosure is described in more detail with reference to the flow diagram of FIG. 7 regarding the update procedure of the CIO/TTT in a failure situation.

When the processor 120 has detected 700 that a beam change condition is fulfilled, the processor 120 examines 701 whether the entering condition for initiating a handover procedure is applied or not by examining the status of the TTT timer. If the examination reveals that the TTT timer is not running in the mobile terminal i.e. the entering condition is not applied, the processor 120 updates 702 the CIO/TTT based on the configuration of the new serving beam.

If, however, the examination reveals that the entering condition is applied i.e. the TTT timer is running, the processor 120 examines 703 the value of the forced_update flag. If the processor 120 determines that the forced_update flag is set, the processor 120 causes the mobile terminal to update 704 the CIO/TTT based on the configuration of the new serving beam. If the examination reveals that the forced_update flag is not set, the processor 120 causes the mobile terminal to postpone 706 the update of CIO/TTT when the entering condition is met 705, i.e. the TTT timer of a measurement event has been started. Alternatively, the processor 120 causes the mobile terminal to perform the update 708 of CIO/TTT when the leaving condition is met 707 i.e. TTT timer is stopped or causes the mobile terminal to execute the handover 710 when the TTT timer expires 709.

An RF front end comprises RF circuitry between a baseband processor and one or more antenna ports. The RF front end comprises a transmission path/chain and a reception path/chain. Examples of circuitry of the RF front end comprise one or more band-pass filters, power amplifiers, local oscillators, and mixers. The transmission path converts a baseband signal to RF signal for feeding the RF signal to antenna via an antenna port. The reception path converts an RF signal received by an antenna connected to an antenna port to a baseband signal that is fed to the baseband part. The conversion of the signal between the baseband processor and the antenna port may be via at least one intermediate frequency. The RF frequencies may be licensed or unlicensed frequencies. Examples in accordance with at least some embodiments may utilize at least RF frequencies below 6 GHz.

A baseband signal comprises an unmodulated signal or a modulated signal comprising one or more symbols according to a modulation method. The baseband signal may be an IQ signal comprising an in-phase and a quadrature phase. An example of the modulation method is a multi-carrier modulation method such as an orthogonal frequency-division multiplexing (OFDM) scheme. The OFDM symbols may form a transmission burst for a communications channel of a wireless communications system. Examples of the communications channels comprise at least shared and dedicated communications channels that may be uplink, UL, channels or downlink, DL, channels. An uplink channel refers to a channel for transmitting data from a wireless device to an access node and a downlink channel refers to a channel for transmitting data from an access node to a wireless device.

MIMO in wireless communications is a technique that enables the transmission and reception of multiple independent data streams. This helps to increase the maximum data rate at which communications can occur reliably. Some applications of MIMO are described in the following sections.

A MIMO transceiver, MIMO TRX, comprises at least an RF front end and antenna ports for connecting to multiple antennas for transmission, TX, and reception, RX, of a MIMO transmission. The MIMO transceiver may be capable of single antenna transmissions, e.g. Single input Multiple output, single input single output. The RF front end may be connected to a baseband processor. The RF front end comprise a plurality of unique hardware (HW) paths through the RF front between the baseband processor and antenna ports. The HW paths comprise transmission paths and reception paths. Each of the HW paths introduce a delay that is characteristic for a specific transmission path. A base band signal for a MIMO transmission is processed by two or more transmission paths and fed to at least two antennas via antenna ports. Transmission times of the signal via each of the antennas should be time aligned for reducing a delay margin required of the MIMO transmission.

A baseband transceiver, TRX, may be a baseband processor that performs baseband processing of transmitted and received signals via an RF front end. A typical interface between the baseband processor and the RF front end comprises an analog-to-digital converter, ADC, and a digital-to-analog converter, DAC. The baseband processor processes baseband signals for transmission and reception by the RF front end.

At least some of the embodiments may be applied in a wireless communication system or a wireless communication network that supports TSN. 5G standard is seen as one example that could fit to meet very stringent requirements in terms of both latency and reliability as well as highly precise synchronization accuracy of the applications running over TSN networks. Also other standards may be feasible.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UNITS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 8:
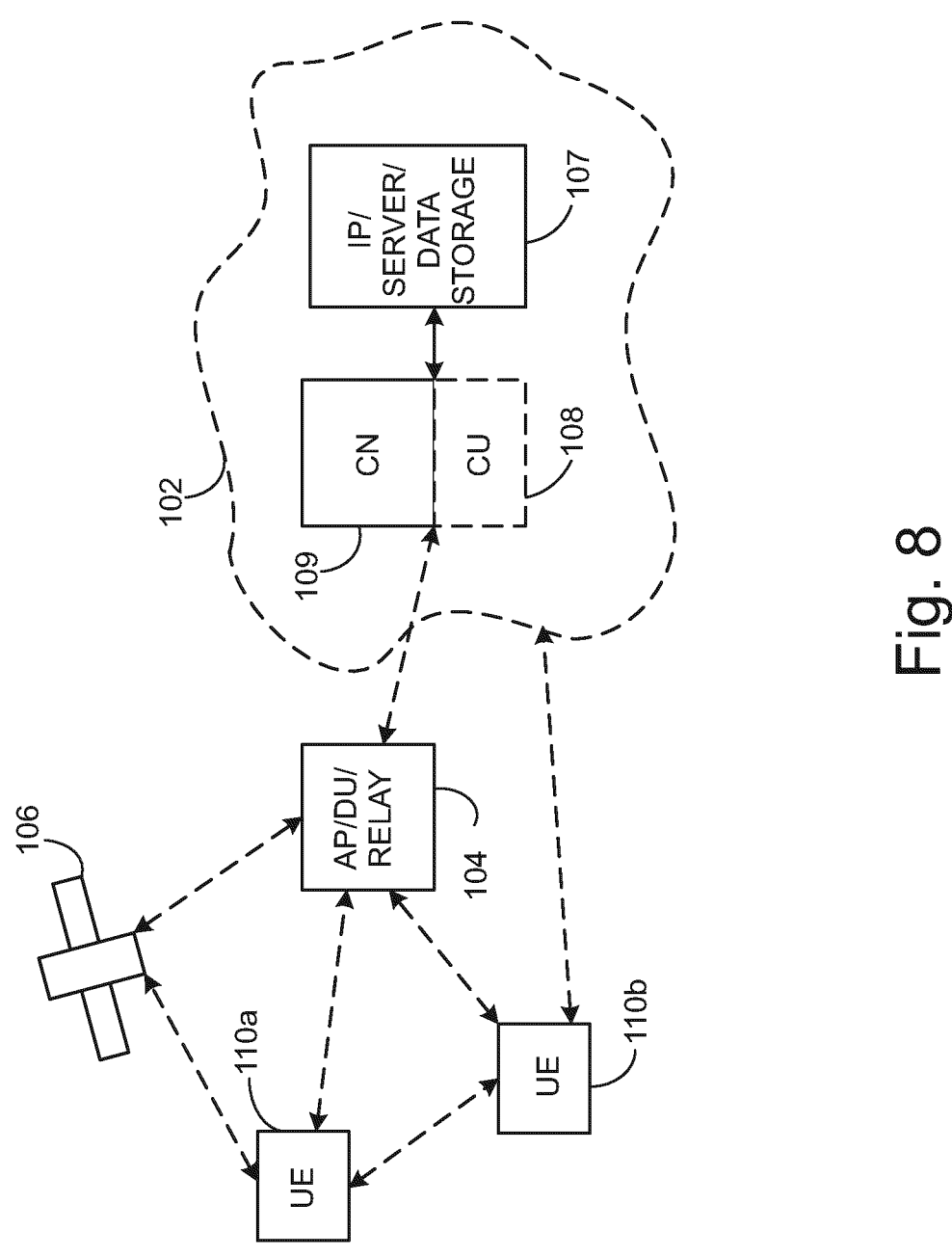
FIG. 8 shows a part of an exemplifying wireless communications access network in accordance with at least some embodiments.

FIG. 8 depicts examples of simplified system architectures only showing some elements and functional entities, all being logical units, whose implementation may differ from what is shown. The connections shown in FIG. 8 are logical connections; the actual physical connections may be different. It is apparent to a person skilled in the art that the system typically comprises also other functions and structures than those shown in FIG. 8.

The embodiments are not, however, restricted to the system given as an example but a person skilled in the art may apply the solution to other communication systems provided with necessary properties.

The example of FIG. 8 shows a part of an exemplifying radio access network.

FIG. 8 shows user equipments 110*a* and 110*b* configured to be in a wireless connection on one or more communication channels in a cell with an access node (such as (e/g) NodeB) 104 providing the cell. The physical link from a user equipment to a (e/g)NodeB is called uplink or reverse link and the physical link from the (e/g)NodeB to the user equipment is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 8) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet, or utilize services provided by them. The communication network may also be able to support the usage of cloud services, for example at least part of core network operations may be carried out as a cloud service (this is depicted in FIG. 8 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server 107, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 8 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 8). A HNB Gateway (HNB-GW), which is typically installed within an operator's network may aggregate traffic from a large number of HNBs back to a core network.

Figure 9:
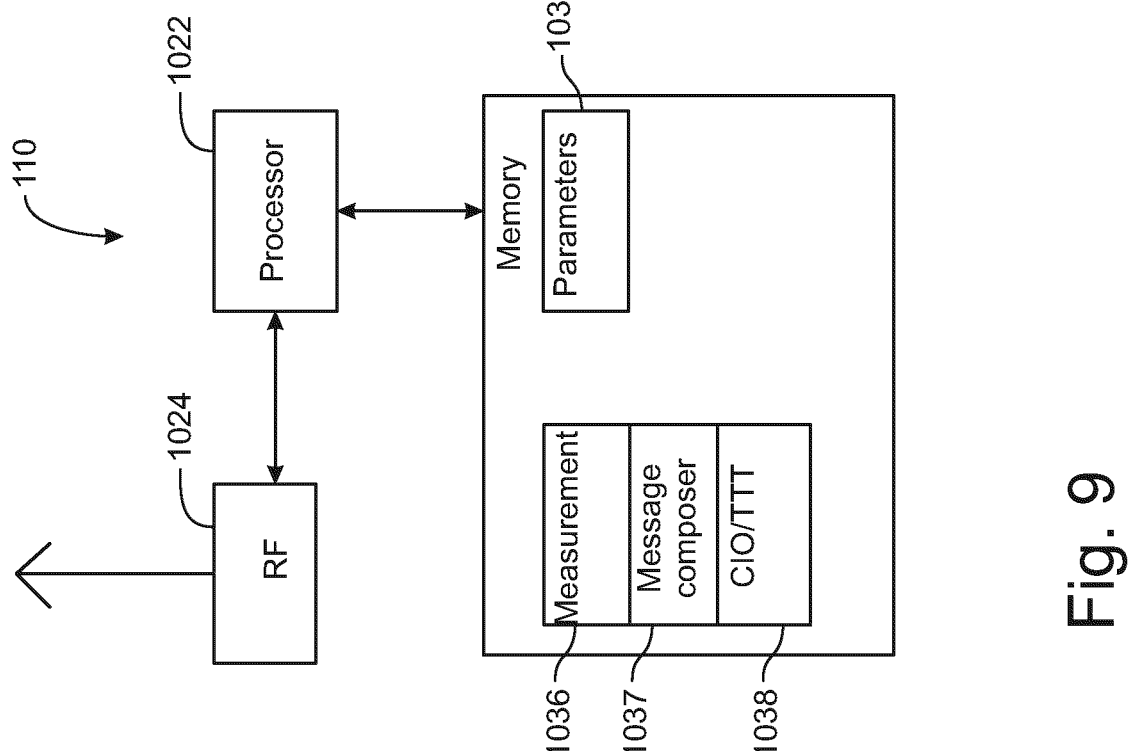
FIG. 9 shows a block diagram of an apparatus in accordance with at least some embodiments.

FIG. 9 illustrates an example of a block diagram of an apparatus 110 in accordance with at least some embodiments of the present invention. The apparatus 110 may be, for example, a part of the resource manager. The apparatus 110 comprises a processor 1022, a memory 1024 and a transceiver 1024 (a.k.a. RF front end). The processor is operatively connected to the transceiver for controlling the transceiver. The apparatus may comprise a memory 1026. The memory may be operatively connected to the processor. It should be appreciated that the memory may be a separate memory or included to the processor and/or the transceiver. The memory 1026 may be used to store information 1039, for example, about CIO/TTT values, the forced_update flag and/or some other information.

FIG. 9 also illustrates some operational units as a computer code stored in the memory but they may also be implemented using hardware components or as a mixture of computer code and hardware components. The operational units may comprise, for example, a measurement unit 1036, an RLF message composer 1037, a CIO/TTT update unit 1038, etc.

According to an embodiment, the processor is configured to control the transceiver and/or to perform one or more functionalities described with a method according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(memories) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:

measuring signals of one or more beams of a cell of a wireless communication network for handover;

obtaining information of an identity of the one or more beams from the measured signals;

storing the measurement results and the identity of the one or more beams;

determining whether to update one or more parameters related to the handover;

based on a beam operating as a serving beam for the cell is changing target beam:

updating the or more parameters based on a leaving condition for a handover applies or a flag indicating a forced update for a pair of the serving beam and the target beam is set; and otherwise postponing updating of the one or more parameters if an entering condition for a handover applies until the leaving condition for the handover applies; and sending the measurement results and the identity of the one or more beams to the wireless communication network when at least one predetermined condition is fulfilled.

2. The method according to claim 1, wherein the at least one predetermined condition is one or more of the following:

a successful handover from a serving cell to a target cell;

a successful reconnection to the serving cell;

a successful reconnection to another cell;

a successful re-establishment to the serving cell; or a successful re-establishment to another cell.

3. The method according to claim 1 further comprising:

measuring a serving beam for a certain time interval indicated with the wireless communication network; and calculating a combination of the measurement results.

4. The method according to claim 1 further comprising: utilizing the updated one or more parameters in further communication with the wireless cor munication network.

5. The method according to claim 1 further comprising:

attaching with the measurement results an indication whether a forced update flag was enabled with the wireless communication network or not.

6. An apparatus, comprising:

at least one processor; and at least one memory storing instructions that, when executed with the at least one processor, cause the apparatus to perform at least the following:

measure signals of one or more beams of a cell of a wireless communication network for handover;

obtain information of an identity of the one or more beams from the measured signals;

store the measurement results and the identity of the one or more beams;

determine whether to update one or more parameters related to the handover;

based on a beam operating as a serving beam for the cell is changing to target beam:

update the one or more parameters based on a leaving condition for a handover applies or a flag indicating a forced update for a pair of the serving beam and the target beam is set; and otherwise postpone updating of the one or more parameters if an entering condition for a handover applies until the leaving condition for the handover applies; and send the measurement results and the identity of the one or more beams to the wireless communication network when at least one predetermined condition is fulfilled.

7. The apparatus according to claim 6 wherein the at least one predetermined condition is one or more of the following:

a successful handover from a serving cell to a target cell;

a successful reconnection to the serving cell;

a successful reconnection to another cell;

a successful re-establishment to the serving cell; or a successful re-establishment to another cell.

8. The apparatus according to claim 6 wherein the at least one memory further stores instructions that, when executed with the at least one processor, cause the apparatus to perform at least the following:

measuring a serving beam for a certain time interval indicated with the wireless communication network; and calculating a combination of the measurement results.

9. The apparatus according to claim 6 wherein the at least one memory further stores instructions that, when executed with the at least one processor, cause the apparatus to perform at least the following: utilizing the updated one or more parameters in further communication with the wireless communication network.

10. The apparatus according to claim 6 wherein the at least one memory further stores instructions that, when executed with the at least one processor, cause the apparatus to perform at least the following:

attaching with the measurement results an indication whether a forced update flag was enabled with the wireless communication network or not.

11. The apparatus according to claim 6 wherein the apparatus is a mobile terminal or a user equipment.

12. A non-transitory program storage device readable with an apparatus tangibly embodying a program of instructions executable with the apparatus for causing the apparatus to perform at least the following:

measuring signals of one or more beams of a cell of a wireless communication network for handover;

obtaining information of an identity of the one or more beams from the measured signals;

storing the measurement results and the identity of the one or more beams;

determining whether to update one or more parameters related to the handover;

based on a beam operating as a serving beam for the cell is changing to a target beam:

updating the one or more parameters based on a leaving condition for a handover applies or a flag indicating a forced update for a pair of the serving beam and the target beam is set; and otherwise postponing updating of the one or more parameters if an entering condition for handover applies until the leaving condition for the handover applies; and sending the measurement results and the identity of the one or more beams to the wireless communication network w en at least one predetermined condition is fulfilled.

13. The non-transitory program storage device according to claim 12 wherein the at least one predetermined condition is one or more of the following:

a successful handover from a serving cell to a target cell;

a successful reconnection to the serving cell;

a successful reconnection to another cell;

a successful re-establishment to the serving cell; or a successful re-establishment to another cell.

14. The non-transitory program storage device according to claim 12 tangibly embodying the program of instructions executable with the apparatus for causing the apparatus to perform at least the following:

measuring a serving beam for a certain time interval indicated with the wireless communication network; and calculating a combination of the measurement results.

15. The non-transitory program storage device according to claim 12 tangibly embodying the program of instructions executable with the apparatus for causing the apparatus to perform at least the following: utilizing the updated one or more parameters in further communication with the wireless communication network.

16. The non-transitory program storage device according to claim 12 tangibly embodying the program of instructions executable with the apparatus for causing the apparatus to perform at least the following:

attaching with the measurement results an indication whether a forced update flag was enabled with the wireless communication network or not.

\* \* \* \* \*